United States Patent
Robinson et al.

(10) Patent No.: US 10,205,410 B2
(45) Date of Patent: Feb. 12, 2019

(54) INSULATING SHEET HAVING ELECTROSTATIC CHARGES CAUSING ATTRACTION

(71) Applicants: Kelly Stephen Robinson, Fairport, NY (US); Nelson Pizarro, Pasadena, CA (US); Nelson Pizarro, II, Ramona, CA (US)

(72) Inventors: Kelly Stephen Robinson, Fairport, NY (US); Nelson Pizarro, Pasadena, CA (US); Nelson Pizarro, II, Ramona, CA (US)

(73) Assignee: EcoStatic Industries LLC, Atlanta, GA (US)

( * ) Notice: Subject to any disclaimer, the term of this patent is extended or adjusted under 35 U.S.C. 154(b) by 0 days.

(21) Appl. No.: 14/576,493

(22) Filed: Dec. 19, 2014

(65) Prior Publication Data

US 2016/0329133 A1  Nov. 10, 2016

(51) Int. Cl.
*H01B 17/56* (2006.01)
*H02N 13/00* (2006.01)
*G09F 3/04* (2006.01)
*G09F 7/12* (2006.01)

(52) U.S. Cl.
CPC .............. *H02N 13/00* (2013.01); *G09F 3/04* (2013.01); *G09F 7/12* (2013.01); *G09F 2007/125* (2013.01)

(58) Field of Classification Search
CPC ............................................... G02F 2001/1676
USPC .......................................................... 428/98
See application file for complete search history.

(56) References Cited

U.S. PATENT DOCUMENTS 4,238,030 A * 12/1980 Maylandt ............. B65D 85/544
                                                                206/308.3

* cited by examiner

*Primary Examiner* — Brent T O'Hern
(74) *Attorney, Agent, or Firm* — Kelly S. Robinson

(57) ABSTRACT

Disclosed is a sheet repositionable that is attracted to a nearby object by electrostatic charges. The sheet requires no pressure sensitive adhesive to stick to the object. The sheet is attracted to the nearby object by electrostatic charges on the sheet. The sheet has a first surface and a second surface. The electrostatic charges may be on the first surface, on the second surface, or on both the first surface and the second surface. The electrostatic charges have both a magnitude and a polarity that can be either positive or negative. The charges on the sheet may be all positive, the charges may be all negative, or the sheet may have regions of positive electrostatic charges and regions of negative electrostatic charges. In each case, the magnitude of the charges is sufficient to attract the sheet to the nearby object. Once the sheet is in contact with the object, electrostatic charges causes the sheet to stick to the object.

5 Claims, 14 Drawing Sheets

| | |
|---|---|
| 101 | Sheet |
| 102 | First surface of sheet |
| 103 | Second surface of sheet |
| 104 | Row of positive charges on the first surface |
| 106 | Row of negative charges on the first surface |
| 108 | Distance C between the of rows of charges |
| 112 | Width $W_{SHEET}$ of Sheet |
| 113 | Length $L_{SHEET}$ of sheet |

| | |
|---|---|
| 101 | Sheet |
| 102 | First surface of sheet |
| 103 | Second surface of sheet |
| 104 | Row of positive charges on the first surface |
| 106 | Row of negative charges on the first surface |
| 108 | Distance C between the of rows of charges |
| 112 | Width $W_{SHEET}$ of Sheet |
| 113 | Length $L_{SHEET}$ of sheet |

| 201 | Sheet |
| --- | --- |
| 202 | First surface of the sheet |
| 203 | Second surface of the sheet |
| 204 | Rows of positive charges on the first surface |
| 206 | Rows of negative charges on the first surface |
| 208 | Distance C between rows of charges |
| 213 | Length $L_{SHEET}$ of the sheet |
| 217 | Distance D from the sheet to the nearby object |
| 220 | Nearby object |
| 222 | Electric field lines |

| | | |
|---|---|---|
| 301 | Sheet | |
| 302 | First surface of the sheet | |
| 303 | Second surface of the sheet | |
| 304 | Rows of positive charges on the first surface | |
| 306 | Rows of negative charges on the first surface | |
| 308 | Distance C between centerlines of rows of charges | |
| 313 | Length $L_{SHEET}$ of the sheet | |
| 317 | Distance D from the sheet to the nearby object | |
| 320 | Nearby object | |
| 322 | Electric field lines | |

| 401 | Sheet |
| --- | --- |
| 402 | First surface of sheet |
| 403 | Second surface of sheet |
| 404 | Centerline of rows of positive charges on the first surface |
| 405 | Mask for making rows of positive charges |
| 409 | Distance 2C between the centerlines of rows of positive charges |
| 412 | Width $W_{SHEET}$ of Sheet |
| 413 | Length $L_{SHEET}$ of sheet |
| 428 | Holes in Mask |

| 501 | Sheet |
|---|---|
| 502 | First surface of sheet |
| 503 | Second surface of sheet |
| 506 | Centerline of a rows of negative charges on the first surface |
| 507 | Mask for making rows of negative charges |
| 510 | Distance 2C between the centerlines of rows of negative charges |
| 512 | Width $W_{SHEET}$ of Sheet |
| 513 | Length $L_{SHEET}$ of sheet |
| 528 | Holes in mask. |

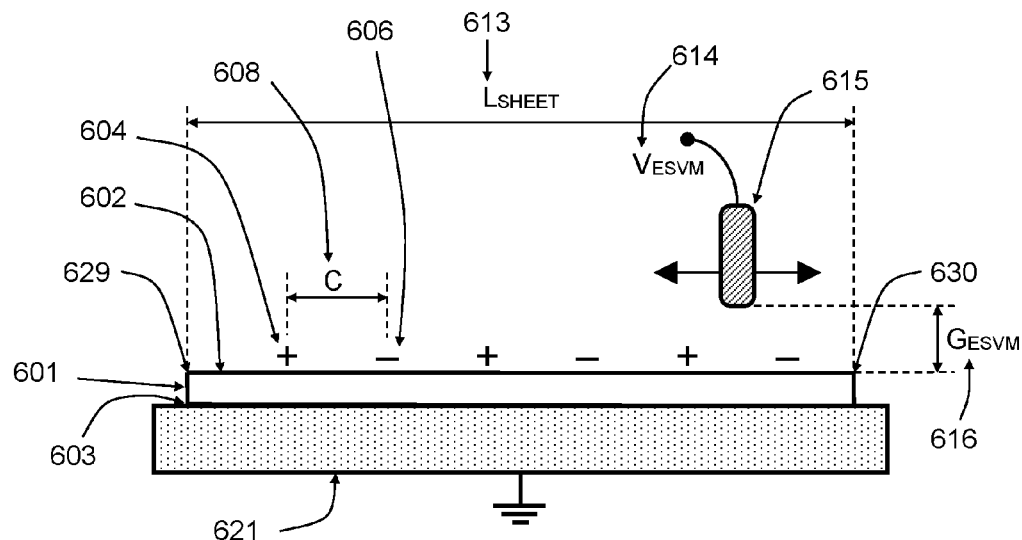

Figure 6

| 601 | Sheet |
| --- | --- |
| 602 | First surface of the sheet |
| 603 | Second surface of the sheet in contact with the nearby object |
| 604 | Rows of positive charges on the first surface |
| 606 | Row of negative charges on the first surface |
| 608 | Distance C between centerlines of rows of charges |
| 613 | Length $L_{SHEET}$ of the sheet |
| 614 | Voltage $V_{ESVM}$ measured by electrostatic voltmeter |
| 615 | Probe of the non-contacting electrostatic voltmeter |
| 616 | Gap $G_{ESVM}$ from probe to the first surface |
| 621 | Nearby grounded, conducting object |
| 629 | First end of the sheet |
| 630 | Second end of the sheet |

| 801 | Sheet |
| --- | --- |
| 802 | First surface of sheet |
| 803 | Second surface of sheet |
| 804 | Centerlines of rows of positive charges on the first surface |
| 808 | Distance C between the centerlines of rows of charges |
| 812 | Width $W_{SHEET}$ of Sheet |
| 813 | Length $L_{SHEET}$ of sheet |
| 818 | Centerlines of rows of positive charges on the second surface |

| 901 | Sheet |
| --- | --- |
| 902 | First surface of the sheet |
| 903 | Second surface of the sheet |
| 904 | Rows of positive charges on the first surface |
| 908 | Distance C between centerlines of rows of charges |
| 913 | Width $W_{SHEET}$ of the sheet |
| 917 | Distance D from the sheet to a nearby object |
| 918 | Rows of positive charges on the second surface |
| 920 | Nearby object |
| 922 | Electric field lines |

| 1001 | Sheet |
|---|---|
| 1002 | First surface of sheet |
| 1003 | Second surface of sheet |
| 1004 | Centerlines of rows of positive charges on the first surface |
| 1008 | Distance C between the centerlines of rows of charges |
| 1012 | Width $W_{SHEET}$ of Sheet |
| 1013 | Length $L_{SHEET}$ of sheet |
| 1019 | Centerlines of rows of negative charges on the second surface |

| 1101 | Sheet |
| 1102 | First surface of the sheet |
| 1103 | Second surface of the sheet |
| 1104 | Rows of positive charges on the first surface |
| 1108 | Distance C between rows of charges |
| 1112 | Width $W_{SHEET}$ of the sheet |
| 1117 | Distance D from the sheet to the nearby object |
| 1119 | Rows of negative charges on the second surface |
| 1120 | Nearby object |
| 1122 | Electric field lines |

| 1201 | Sheet |
| --- | --- |
| 1202 | First surface of the sheet |
| 1203 | Second surface of the sheet |
| 1204 | Rows of positive charges on the first surface |
| 1208 | Distance C between centerlines of rows of static charges |
| 1212 | Width $W_{SHEET}$ of the sheet |
| 1217 | Distance D from the sheet to the nearby object |
| 1219 | Rows of negative charges on the second surface |
| 1220 | Nearby object |
| 1222 | Electric field lines |

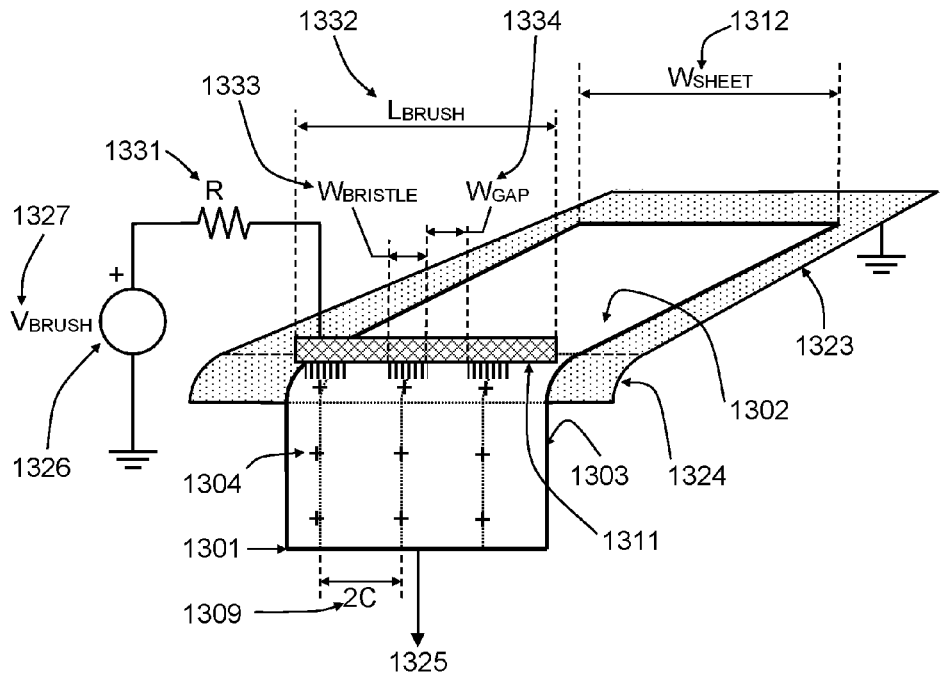

Figure 13

| 1301 | Sheet | 1324 | Curved edge of metal bench top |
|---|---|---|---|
| 1302 | First surface of the sheet | 1325 | Sheet being pulled beneath conductive brush |
| 1303 | Second surface of the sheet | 1326 | Power supply |
| 1304 | Row of positive static charges on the first surface | 1327 | Voltage applied to conductive brush by power supply |
| 1309 | Distance 2C between rows of positive charges | 1331 | Resistor |
| 1311 | Conductive brush | 1332 | Brush length $L_{BRUSH}$ |
| 1312 | Width $W_{SHEET}$ of the sheet | 1333 | Width of full length bristles $W_{BRISTLE}$ |
| 1323 | Grounded metal bench top | 1334 | Width where bristles have been trimmed $W_{GAP}$ |

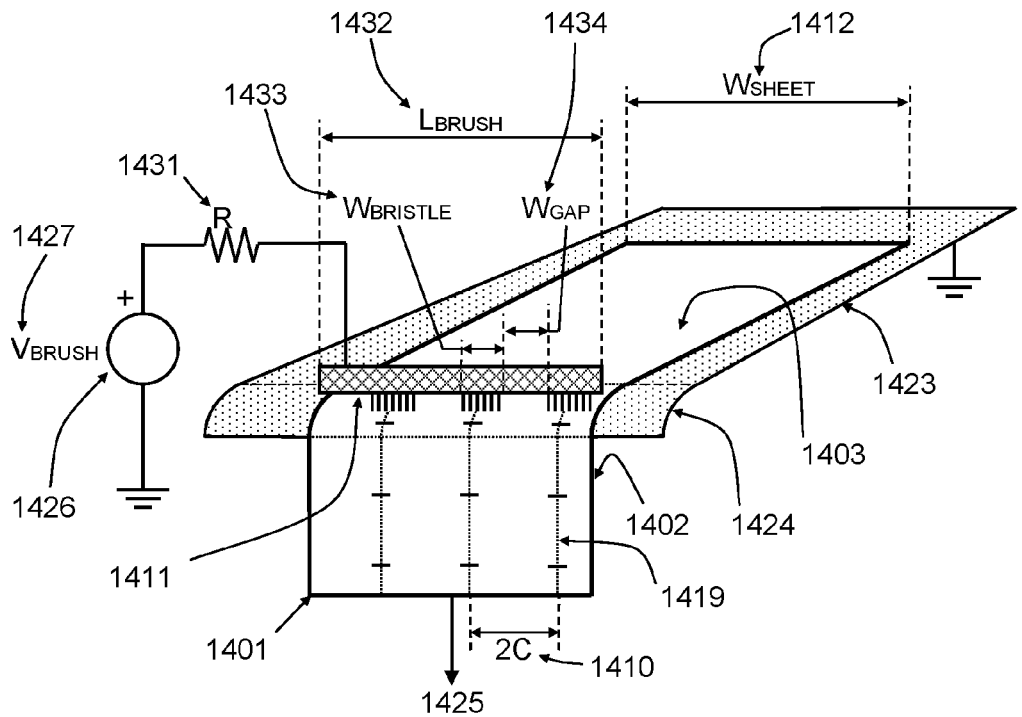

Figure 14

| 1401 | Sheet | 1425 | Sheet being pulled beneath conductive brush |
| 1402 | First surface of the sheet | 1426 | Power supply |
| 1403 | Second surface of the sheet | 1427 | Voltage applied to conductive brush by power supply |
| 1410 | Distance 2C between rows of negative charges | 1431 | Resistor |
| 1411 | Conductive brush | 1432 | Length $L_{BRUSH}$ of the conductive brush |
| 1412 | Width $W_{SHEET}$ of the sheet | 1433 | Width $W_{BRISTLE}$ of full length bristles |
| 1423 | Grounded metal bench top | 1434 | Width $W_{GAP}$ where bristles have been trimmed |
| 1424 | Curved edge of metal bench top | | |

INSULATING SHEET HAVING ELECTROSTATIC CHARGES CAUSING ATTRACTION

CROSS REFERENCE TO RELATED APPLICATIONS

Not Applicable

STATEMENT REGARDING FEDERALLY SPONSORED RESEARCH OR DEVELOPMENT

Not Applicable

BACKGROUND

Repositionable adhesive note papers, charts and posters are available commercially and provide a substantial volume of business. The adhesive utilized in many of these products is applied to a narrow band along the edge of one surface the repositionable sheets. Information relevant to adhesives used for these products can be found in U.S. Pat. No. 3,691,140 9/1972 to Silver, U.S. Pat. No. 3,857,731 12/1974 to Merrill, and U.S. Pat. No. 5,153,041 6/1992 to Clements et al. that describes a pressure sensitive adhesive comprising inherently tacky, elastomeric copolymer microspheres protruding from a binder. The narrow band of pressure sensitive adhesive must be applied to the edge of one surface of each sheet during the manufacturing process.

The binders for the pressure sensitive adhesive layer are often polymers that are soluble in solvents that are harmful to human health and to the environment. The manufacturing processes that uses these solvents employ safeguard to protect operators and machinery to capture the solvents before they are emitted to the environment. Even with state-of-the-art safeguards and solvent capture technologies, workers continue to be exposed to solvents and solvents continue to be emitted into our environment.

A common feature of pressure sensitive adhesive layers is that the layer on one surface of the note paper, chart or poster must physically touch the object to stick the sheet to the object. When the adhesive layer does not touch the object, the sheet does not stick to the object.

Commonly, the adhesive layer on one surface of a sheet will become contaminated with dust or paper fibers. Consequently, the sheet loses its ability to stick to objects after a few repeated uses.

For the foregoing reasons, there is a need for a method to attract sheets to nearby objects while eliminating the use of solvents in the manufacturing process and so that the sheets are attracted to the object even when the sheets are simply near the object and do not touch the object.

SUMMARY

The present invention is directed to a sheet that is attracted to a nearby object. The sheet requires no pressure sensitive adhesive to stick to the object. The sheet is attracted to the nearby object by electrostatic charges on the sheet. Electrostatic charges have both a magnitude and a polarity that can be either positive or negative. As will be describe, the charges on the surface of the sheet may be all positive, the charges may be all negative, or the sheet may have regions of positive electrostatic charges and regions of negative electrostatic charges. In each case, the magnitude of the electrostatic charges is sufficient to attract the sheet to the nearby object. Once the sheet is in contact with the object, electrostatic charges causes the sheet to stick to the object.

Electrostatic charges may be applied to one surface or both surfaces of the sheet during the manufacturing process using, for example, a corona device as described in U.S. Pat. No. 4,591,713 to Gundlach and Bergen entitled "An Efficient, Self-Limiting Corona Device For Positive Or Negative Charging." The electrostatic charges must persist to cause the sheet to be attracted to nearby objects later when the sheet is used. Electrostatic charges persists on electrically insulating surfaces, which have high surface electrical resistivities. The electrical resistivities of surfaces may be measured by several different methods. One such method is describe in ASTM D257 Standard Test Method for DC Resistance or Conductance of Insulating Materials. Using this method, we find that the surface electrical resistivity of the sheet must be at least $1.0 \times 10^{+13}$ ohms for the electrostatic charges applied to the surface of the sheet to persist and later cause the sheet to be attracted to a nearby object.

The electrostatic charges on the sheet may be measured by several different methods. One such method is describe in Wagner, J. R. (2012) Handbook of Troubleshooting Plastic Processes, John Wiley & Sons, Inc., Hoboken N.J. and Scrivener Publishing, Salem Mass., Chapter_21 Troubleshooting Static Problems in Plastic Processes, section 21.3 Static Measurement Tools, Non-Contacting Electrostatic Voltmeters—Voltmeter respond to Surface Charge where the sheet is placed_on a grounded, conducting object such as a flat piece of sheet metal. The electrostatic charges on the exposed surface of the sheet cause the exposed surface to have a surface potential. The surface potential may be measured using a non-contacting electrostatic voltmeter such as Trek Model 370 electrostatic voltmeter. The non-contacting electrostatic voltmeter measures the surface potential in units of volts. Using this method, we find that the magnitude of the surface potential must exceed 100 volts for the sheet to be attracted to nearby objects.

The electrostatic charges on the sheet need not be distributed over one surface or both surfaces of the sheet. In another version of the present invention, the electrostatic charges are confined to a row of charges on a surface of the sheet.

In yet another version of the present invention, the electrostatic charges on the sheet are confined to a first row of charges and a second row of charges on a surface of the sheet where the charges in the second row have the same polarity as the electrostatic charges in the first row.

The sheet has a first surface and a second surface. In yet another version of the present invention, the electrostatic charges are confined to a first row of charges on the first surface and a second row of charges on the second surface of the sheet where the charges in the second row have the same polarity as the electrostatic charges in the first row.

When the electrostatic charges on the sheet have only one polarity, that is, when the charges on the sheet are all positive or the charges on the sheet are all negative, the sheet is attracted to the nearby object when the distance between the sheet and the nearby object is smaller than the width of the sheet. For larger sheets that are, for example, the size of a wall poster, electrostatic attraction when the sheet is relatively far from the nearby object makes the sheet hard to handle and difficult to position onto the nearby object.

In yet another version of the present invention, the electrostatic attraction to the nearby object occurs only when the sheet is very close to the nearby object making the sheet easier to handle and easier to position onto the surface. In this version of the present invention, the electrostatic charges are confined to a first row of charges and a second row of charges on a surface. The second row of charges has a polarity opposite to the polarity of the first row of electrostatic charges. The magnitude of the first row of charges together with the magnitude of the second row of charges are sufficient to attract the sheet to a nearby object.

With two rows of electrostatic charge having opposite polarities, the sheet is attracted to the nearby object when the distance from the sheet to the nearby object is no greater than the distance from the centerline of the first row to the centerline of the second row. For example, when the distance from the centerline of the first row to the centerline of the second row is one inch, a wall poster sized sheet will be attracted to the nearby object when the sheet is no greater than one inch to the object. Having the sheet attracted to the nearby object only when the sheet is close to the nearby object makes the sheet easier to handle and position.

The electrostatic charges in the first row cause the sheet surface in the row to have a first surface potential. Similarly, the electrostatic charges in the second row cause the sheet surface of the second row to have a second surface potential. The surface potentials may be measured using a non-contacting electrostatic voltmeter such as Trek Model 370 electrostatic voltmeter. Using this method, we find that the magnitudes of the surface potentials must exceed 100 volts in each row for the sheet to be attracted to the nearby object.

In yet another version of the present invention, the first surface of the sheet has a first row of electrostatic charges and the second surface of the sheet has a second row of electrostatic charges. The electrostatic charges applied to the sheet in the manufacturing process must persist to cause the sheet to be attracted to a nearby object later when the sheet is used. Consequently, both the first surface and the second surface of the sheet must be electrically insulating. The electrical resistivities of surfaces may be measured by several different methods. One method is describe in ASTM D257 Standard Test Method for DC Resistance or Conductance of Insulating Materials. Using this method, we find that the surface electrical resistivity of the top surface of the sheet and the surface electrical resistivity of the bottom surface of the sheet must be at least $1.0 \times 10^{+13}$ ohms for the electrostatic charges to persist and later cause the sheet to be attracted to a nearby object.

In yet another version of the present invention, the electrostatic charges are arranged in multiple rows on the first surface of the sheet. The electrostatic charges in each row have the same polarity.

In yet another version of the present invention, the electrostatic charges are arranged in multiple rows on the first surface of the sheet. The electrostatic charge in each row have alternating polarities. That is, the first row has positive electrostatic charge, the second row has negative electrostatic charges, and the polarities of subsequent rows alternate.

In yet another version of the present invention, the electrostatic charges on the first surface are arranged in multiple rows and the electrostatic charges on the second surface are also arranged in multiple rows. The polarities of the charges arranged in rows on the first surface all have the same polarity. And, the polarities of the charges arranged in rows on the second surface all have the same polarity that is opposite to the polarity of charges on the top surface.

BRIEF DESCRIPTION OF THE DRAWINGS

These and other features, aspects, and advantages of the present invention will become better understood with regard to the following description, appended claims, and accompanying drawing where:

FIG. 6 is a side view showing rows of electrostatic charges being measured using a non-contacting electrostatic voltmeter.

FIG. 13 is a perspective view showing positive rows of static charges being applied to a sheet by a conductive brush.

FIG. 14 is a perspective view showing rows of negative static charges being applied to a sheet by a conductive brush.

DESCRIPTION

In the Summary above, in this Description, in the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used to the extent possible, in combination with and/or in the context of other particular aspects and embodiment of the invention, and in the invention generally.

The term "comprises" and grammatical equivalents thereof are used herein to mean that other components, ingredients, steps etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and whose upper limit is 100 mm.

Figure 1:
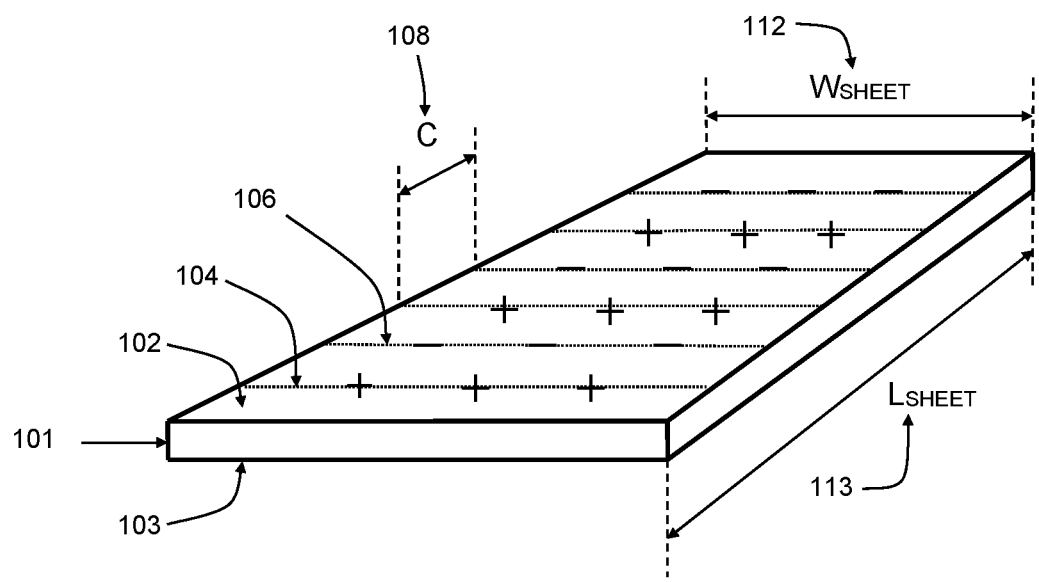
FIG. 1 is perspective view showing electrostatic charges arranged in rows on the first surface of the sheet.

FIG. 1 shows a prospective view of a sheet 101 having width $W_{SHEET}$ 112 and length $L_{SHEET}$ 113. The sheet comprises a first surface 102 and a second surface 103. The first surface 102 has rows of positive electrostatic charges 104 and has rows of negative electrostatic charges 106. The distance between the rows of charge is C 108.

Figure 2:
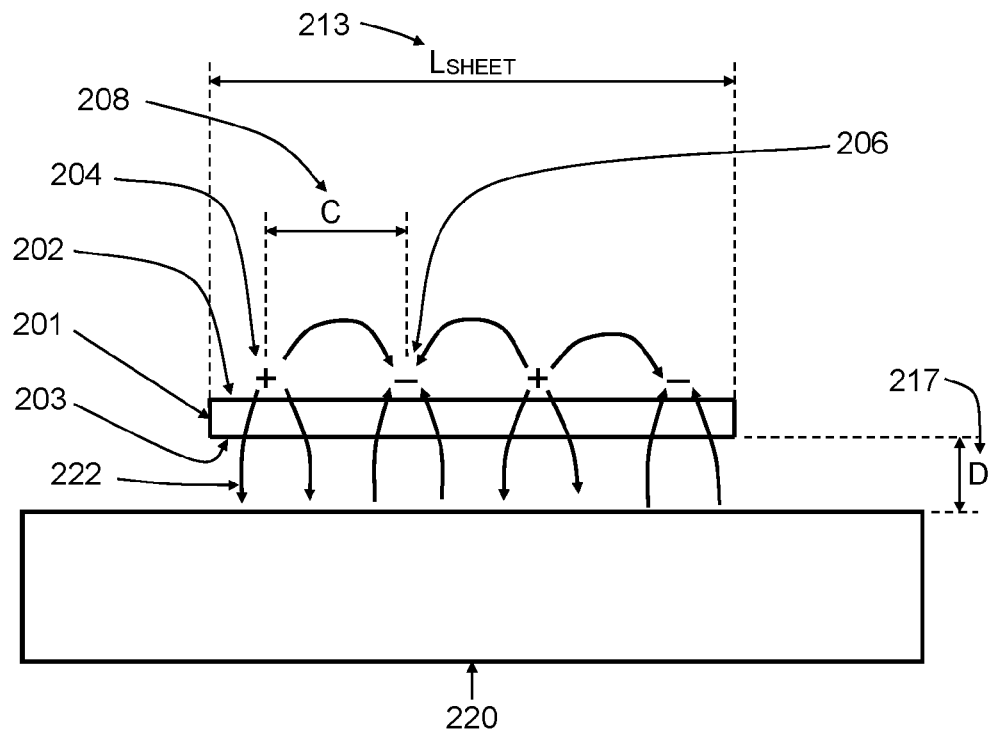
FIG. 2 is a side view showing a sheet attracted to a nearby object by rows of positive electrostatic charges and by rows of negative electrostatic charges.

FIG. 2 shows a side view of a sheet 201 having length $L_{SHEET}$ 213. The sheet 201 has a first surface 202 and second surface 203. The first surface 202 has positive static charges arranged in rows 204 and negative static charges arranged in rows 206. When the distance D 217 from the sheet 201 to the nearby object 220 is at most the distance C 208 from a row of positive electrostatic charges to a row of negative electrostatic charges, electric field lines 222 reach the nearby object 220. Consequently, the rows of positive electrostatic charges 204 and the rows of negative electrostatic charges 206 attract the sheet 201 to the nearby object 220. For example, when distance C 208 from a row of positive electrostatic charges to a row of negative electrostatic charges is 1 inch, the rows of positive static 204 and rows of negative static 206 attract the sheet to the nearby object 220 when the distance D 217 is at most 1 inch.

In use, dust or paper fibers may be on the second surface 203 of the sheet 201. The dust particles or paper fibers separate the second surface of the sheet 203 from the nearby object 220. Consequently, in repeated use, the second surface 203 my not touch the nearby object 220. However, even when the second surface 203 of the sheet 201 does not touch the nearby object 220, the rows of positive electrostatic charge 204 and the rows of negative electrostatic charge 206 attract the sheet 201 towards the nearby object 220.

Figure 3:
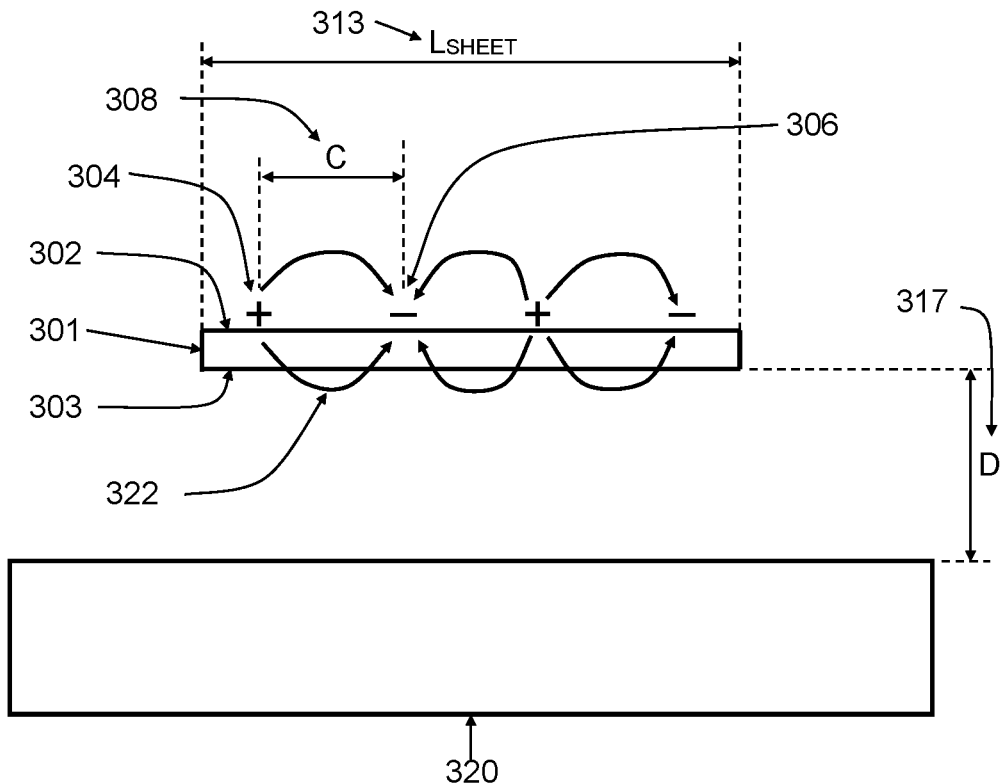
FIG. 3 is a side view showing a sheet with rows of positive electrostatic charges and rows of negative electrostatic charges with no attraction to a nearby object that is too far away.

FIG. 3 shows a side view of a sheet 301 that is not attracted to a nearby object 320. The sheet 301 has a first surface 302 and a second surface 303. The first surface 302 has rows of positive charges 304 and rows of negative charges 306. The distance D 317 between the sheet 301 and the nearby object 320 is greater than the distance C 308 from a row of positive charges 304 to a row of negative charges 306. The electric field lines 322 do not reach the nearby object 320. Consequently, the rows of positive charges 304 and the rows of negative charges 306 do not attract the sheet towards the nearby object 320.

The separation distance C 308 between rows of positive electrostatic charges 304 and rows of negative electrostatic charges 306 is selected to determine the distance at which the electrostatic charges will attract the sheet 301 towards the nearby object 320. The rows of positive electrostatic charge 304 and the rows of negative electrostatic charges 306 must provide strong attraction to the nearby object 320 when the distance D 317 from the sheet 301 to the nearby object 320 is small. We find that the distance C 307 must be at least 0.04 inches.

It is highly desirable for the rows of positive electrostatic charge 304 and rows of negative electrostatic charges 306 to provide no attraction when the distance D 317 from the sheet 301 is at least 6 inches. In use, wall poster size sheets need to be positioned prior to being stuck to a surface. When the sheet 301 is far from the nearby object 320, that is, when the distance D 317 between the sheet 301 and the nearby object 320 is at least 6 inches, attraction of the sheet 301 to the nearby object 320 is undesirable because this attraction interferes with positioning of the sheet 301 onto the nearby object 320.

Consequently, the distance C 308 between rows of positive electrostatic charges 304 and rows of negative electrostatic charges 306 should be at most 6 inches. The useable range for the distance C 308 is 0.04 inches to 6 inches. Preferably, the distance C should be 0.5 inches.

Figure 4:
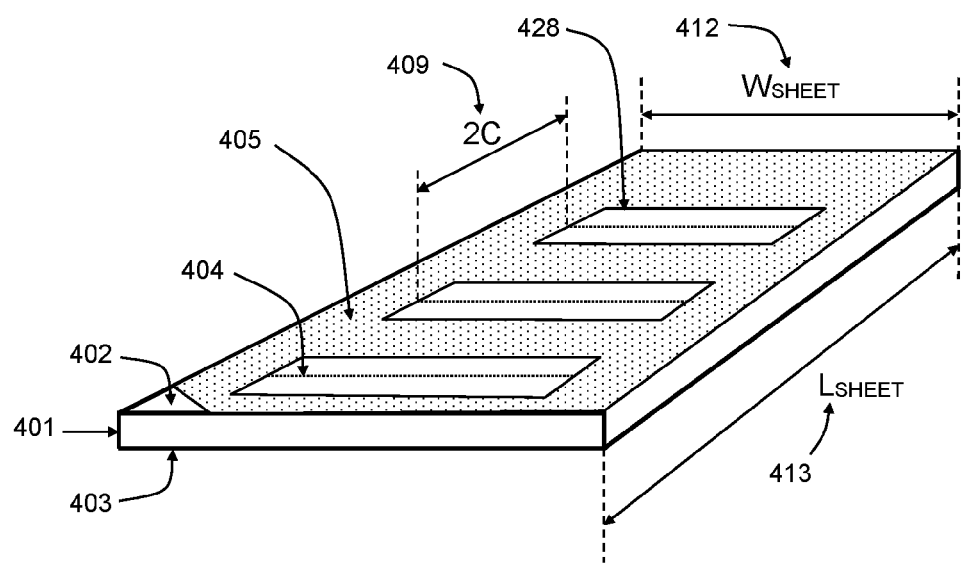
FIG. 4 is a perspective view showing a mask for depositing rows of positive electrostatic charges on the first surface of the sheet.

FIG. 4 is a prospective view showing a method for applying rows of positive electrostatic charges 404 to a sheet 401. A mask 405 is placed on the first surface 402 of the sheet. Positive electrostatic charges are then applied uniformly from above the sheet 401 towards the first surface 402 of the sheet covered by the mask 405. Holes 428 in the mask expose the first surface 402 of the sheet 401 allowing positive electrostatic charges to be applied to the first surface 402 in rows 404. The spacing between the rows of positive electrostatic charges is 2 C 409 that is determined by the spacing between the holes 428 in the mask.

The positive electrostatic charges may be applied using, for example, a corona charge such as found in U.S. Pat. No. 4,591,713 5/1986 to Gundlach and Bergen entitled "AN EFFICIENT, SELF-LIMITING CORONA DEVICE FOR POSITIVE OR NEGATIVE CHARGING." After the charges are applied, the mask 405 is removed. Rows of positive static charges remain on the first surface 402 of the sheet 401.

Figure 5:
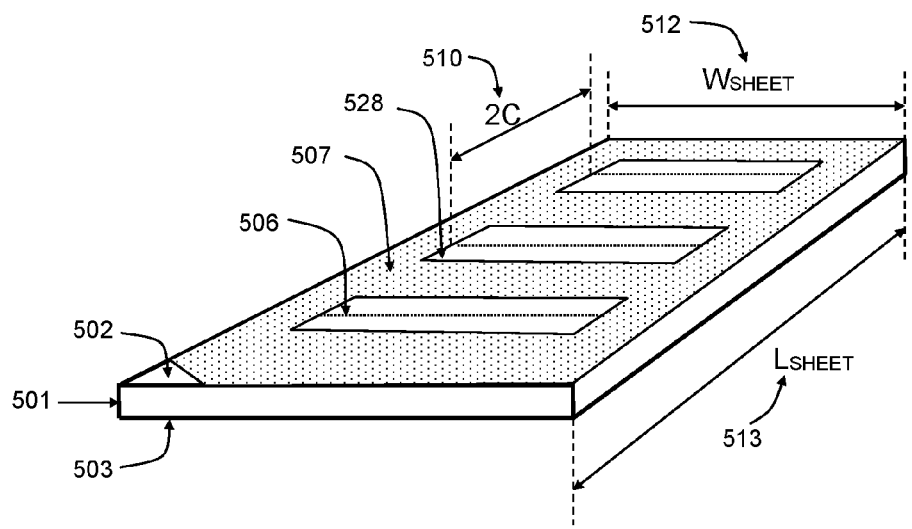
FIG. 5 is a perspective view showing a mask for depositing rows of negative electrostatic charges on the first surface of the sheet.

FIG. 5 is a prospective view showing a method for applying rows of negative electrostatic charges 506 to a sheet 501. A mask 507 for making rows of negative electrostatic charges is placed on the top surface 502 of the sheet. Negative electrostatic charges are then applied uniformly from above the sheet 501 towards the upper surface 502 of the sheet covered by the mask 507. Holes 528 in the mask expose the first surface 502 of the sheet 501 allowing negative electrostatic charges to be applied to the first surface 502 in rows 506. The spacing between the rows of negative electrostatic charges is 2 C 510 that is determined by the spacing between the holes 528 in the mask.

The negative electrostatic charges may be applied using, for example, a corona charge such as found in U.S. Pat. No. 4,591,713 5/1986 to Gundlach and Bergen entitled "AN EFFICIENT, SELF-LIMITING CORONA DEVICE FOR POSITIVE OR NEGATIVE CHARGING." After the charges are applied, the mask is removed. Rows of negative static charges 506 remain on the first surface 502 of the sheet 501.

FIG. 6 is a side view showing a method for measuring the rows of positive electrostatic charges 604 and the rows of negative electrostatic charges 606 on the first surface 602 of a sheet 601. The second surface 603 of the sheet 601 is in contact with a grounded, conducting object 621 such as a piece of sheet metal connected electrically to ground potential. Rows of positive electrostatic charges 604 and rows of negative electrostatic charges 606 on the exposed first surface 602 of the sheet 601 cause the top surface 602 to have a surface potential that is proportional to the charge. The surface potential is measured by the probe 615 of a non-contacting electrostatic voltmeter such as a Trek Inc. Model 370 DC-Stable Electrostatic Voltmeter is positioned above the top surface 602 of the sheet 601 at a distance $G_{ESVM}$ 616 that is 1.5±0.5 mm that is recommended by the vendor.

The probe 615 of the electrostatic voltmeter is moved by hand from the first end 629 of the sheet 601 down the length $L_{SHEET}$ 613 of the sheet 601 to the second end 630 of the sheet 601. Then, the probe 615 of the electrostatic voltmeter is moved by hand from the second end 630 of the sheet 601 down the length $L_{SHEET}$ 613 of the sheet 601 back to the first end 629 of the sheet 601. The voltage $V_{ESVM}$ 614 measured by the non-contacting electrostatic voltmeter is proportional to the positive charges arranged in rows 604 and to the negative charges arranged in rows 606 on the exposed first surface 602 of the sheet 601.

Figure 7:
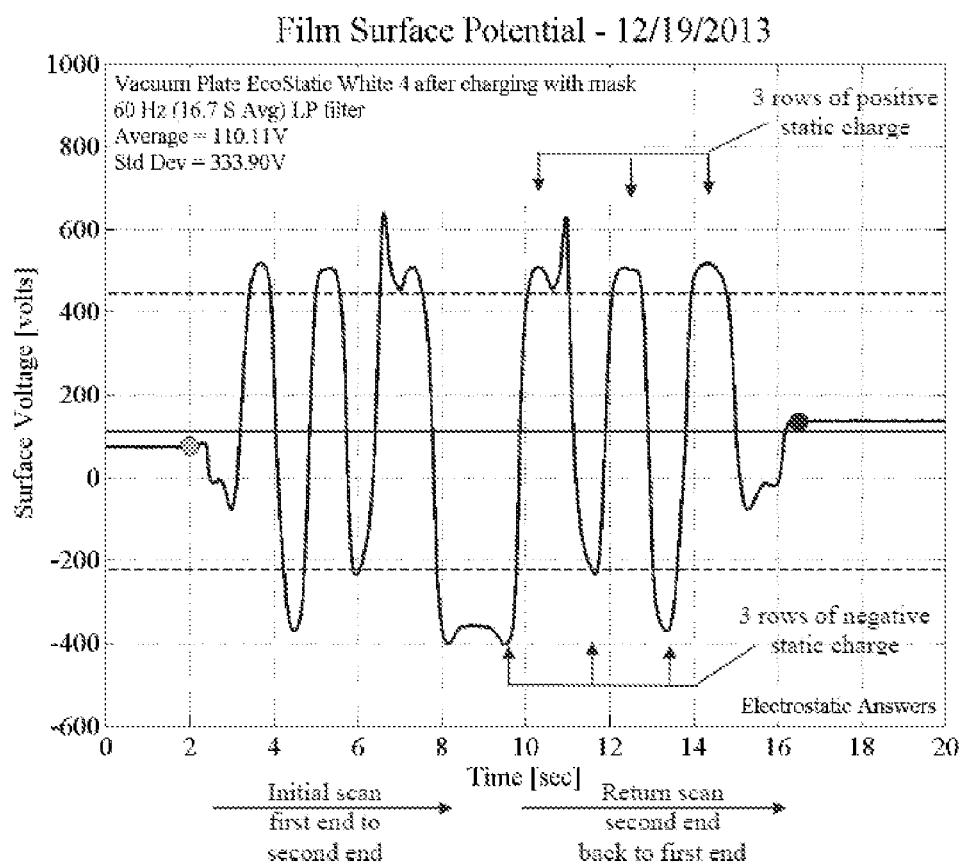
FIG. 7 is a plot of the surface potential measured using a non-contacting electrostatic voltmeter showing rows of electrostatic charges.

FIG. 7 shows a plot of the voltage $V_{ESVM}$ 614 measured on a sheet 601 in FIG. 6 having 3 rows of positive electrostatic charges 604 and 3 rows of negative electrostatic charges 606. The horizontal axis of the plot in FIG. 7 is time measured in seconds beginning at 0 seconds and ending at 20 seconds. The vertical axis of the plot in FIG. 7 is the surface potential measured in volts beginning at −600 volts and ending at +1000 volts.

On the plot in FIG. 7, for the time from 0 to 2 seconds, the probe 615 in FIG. 6 was stationary positioned over the first end 629 of sheet 601. During the period of time from 0 to 2 seconds, the measured surface potential was constant having a value of approximately +90 volts.

On the plot in FIG. 7, for the time from 2 to 8.5 seconds, the probe 615 was moved by hand from the first end 629 to the second end 630 of the sheet 601. During the period of time from 2 to 8.5 seconds, the measured surface potential $V_{ESVM}$ 614 alternated 3 times from a voltage having a positive polarity and a magnitude exceeding 400 volts to a voltage having a negative polarity and a magnitude exceeding 200 volts. The 3 peaks in the surface potential having a positive polarity and a magnitude exceeding 400 volts correspond to rows of electrostatic charges having a positive polarity. The 3 peaks in the surface potential having a negative polarity and a magnitude exceeding 200 volts correspond to rows of electrostatic charges having a negative polarity.

On the plot in FIG. 7, for the time from 8.5 to 9.0 seconds, the probe 615 in FIG. 6 was stationary positioned over the second end 630 of sheet 601. During the period of time from 8.5 to 9.0 seconds, the measured surface potential was constant having a value of approximately −350 volts.

On the plot in FIG. 7, for the time from 9.0 to 16.5 seconds, the probe 615 was moved by hand from the second end 630 back to the first end 629 of the sheet 601 in FIG. 6. During the period of time from 9.0 to 16.5 seconds, the measured surface potential $V_{ESVM}$ 614 again alternated 3 times from a voltage having a negative polarity and a magnitude exceeding 200 volts to a voltage having a positive polarity and a magnitude exceeding 400 volts. During the period of time from 9.0 to 16.5 seconds, the shape of the surface potential is a mirror image of the shape of the surface potential measured during the period of time from 2.0 to 8.5 seconds because the probe 615 was moved over the exposed top surface 603 of sheet 601 having the same positive electrostatic charges arranged in rows 604 and the same negative electrostatic charges arranged in row 606.

On the plot in FIG. 7, for the time from 16.5 to 20.0 seconds, the probe 615 in FIG. 6 was stationary positioned over the first end 630 of sheet 601. During the period of time from 16.5 to 20.0 seconds, the measured surface potential was constant having a value of approximately +120 volts. The surface potential measured during the time period from 16.5 to 20.0 seconds is different from the surface potential measured of +90 volts during the time period from 0 to 2 seconds because the probe 615 was moved by hand and it was returned to a slightly different position at a time of 20 seconds than it started at a time of 0 seconds.

Figure 8:
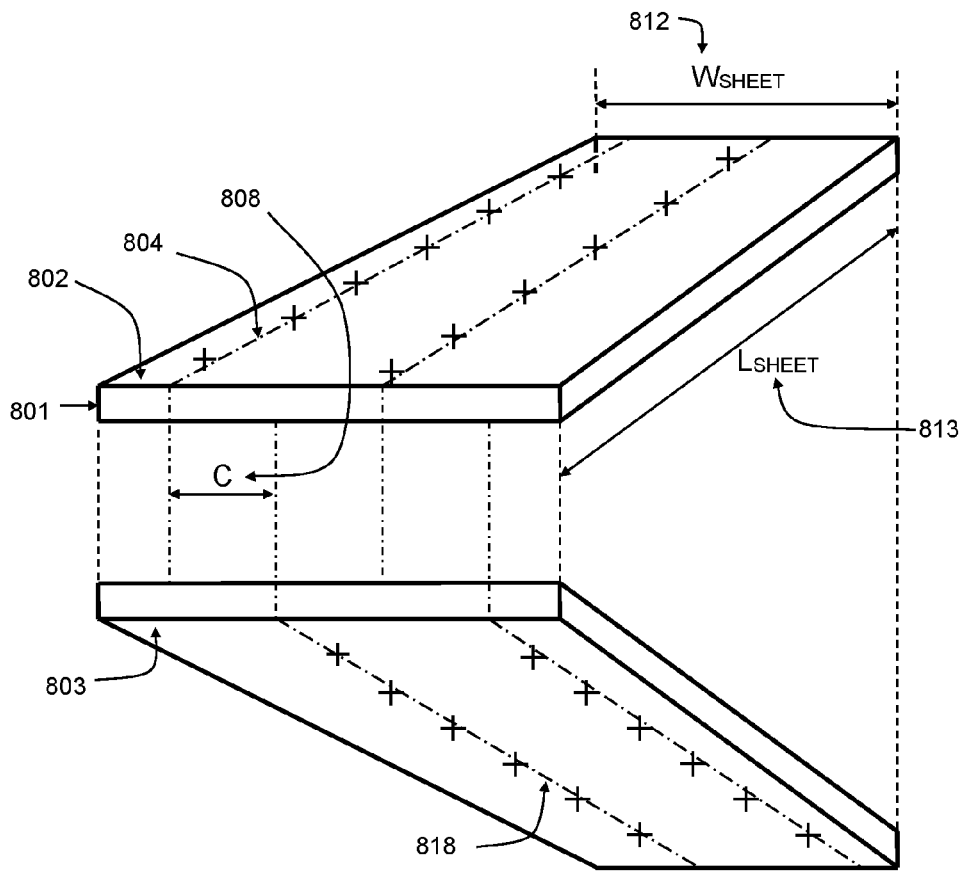
FIG. 8 is a perspective view showing rows of positive electrostatic charges on the first surface and rows of positive electrostatic charges on the second surface of the sheet.

FIG. 8 shows a prospective view of a sheet 801 having width $W_{SHEET}$ 812 and length $L_{SHEET}$ 813. The sheet comprises a first surface 802 and a second surface 803. The first surface 802 has rows of positive electrostatic charges 804. The second surface 803 has rows of positive electrostatic charges 818. The distance between a row of positive charges on the first surface 804 and a row of positive charges on the second surface 818 is C 808.

Figure 9:
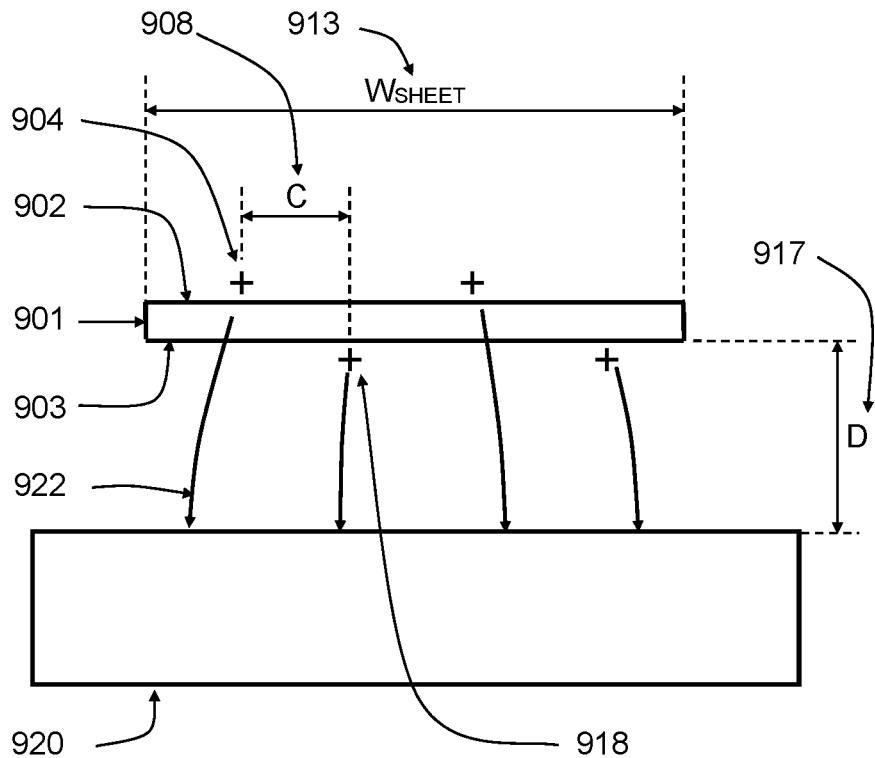
FIG. 9 is a side view of the sheet attracted to a nearby object by rows of electrostatic charges.

FIG. 9 shows a side view of a sheet 901 having width $W_{SHEET}$ 913. The sheet 901 being attracted to a nearby object 920 has a first surface 902 and second surface 903. The first surface 902 has rows of positive charges 904. The second surface 903 has rows of positive static charges 918. When the distance D 917 from the sheet 901 to the nearby object 920 is at most the width of the sheet $W_{SHEET}$ 913, electric field lines 922 reach the nearby object 920. Consequently, the rows of electrostatic charges 904 on the first surface 902 and the rows of positive charges 918 on the second surface 902 attract the sheet 901 towards the nearby object 920.

Figure 10:
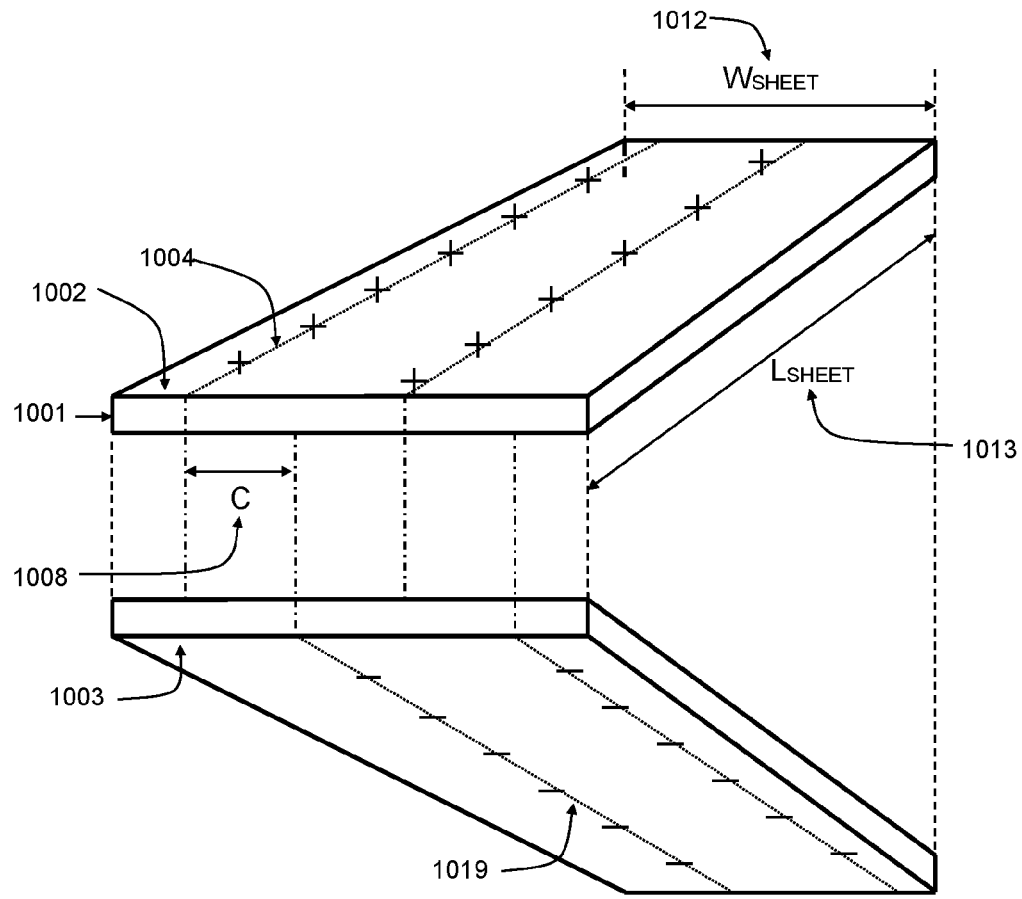
FIG. 10 is a perspective view showing rows of positive electrostatic charges on the first surface and rows of negative electrostatic charges on the second surface of the sheet.

FIG. 10 shows a prospective view of a sheet 1001 having width $W_{SHEET}$ 1012 and length $L_{SHEET}$ 1013. The sheet comprises a first surface 1002 and a second surface 1003. The first surface 1002 has positive charges arranged in rows 1004. The second surface 1003 has negative charges arranged in rows 1019. The distance between the centerlines of rows of positive charges 1004 on the first surface 1002 and the centerlines of rows of negative charges 1018 on the second surface 1003 is C 1008.

Figure 11:
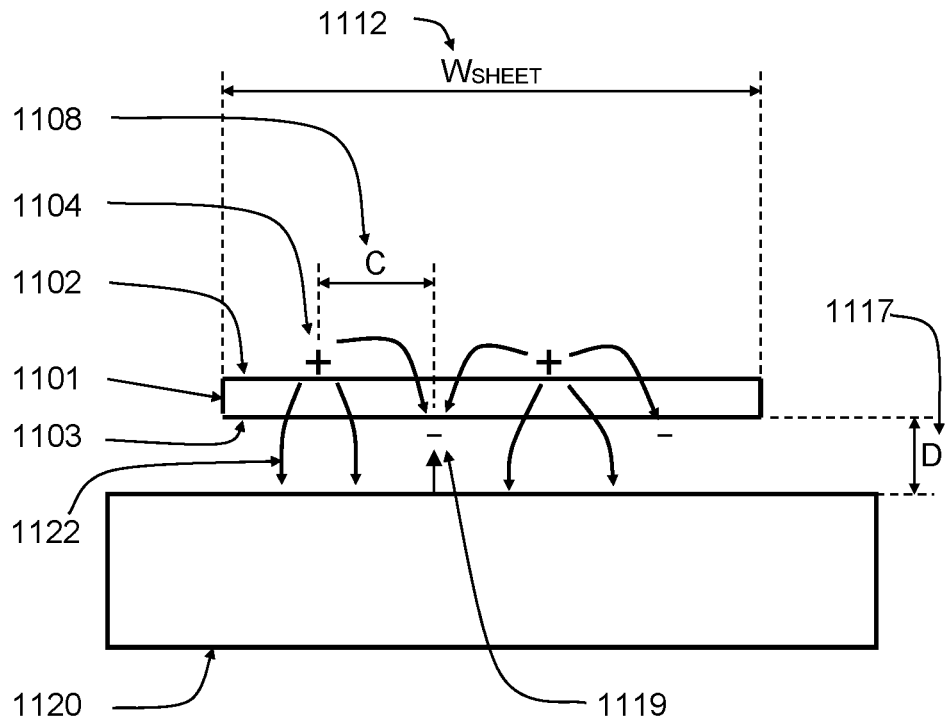
FIG. 11 is a side view showing a sheet attracted to the nearby object by rows of positive charges on the first surface and rows of negative charges on the second surface.

FIG. 11 shows a side view of a sheet 1101 having Width $W_{SHEET}$ 1112. The sheet 1101 has a first surface 1102 and a second surface 1103. The first surface 1103 has positive charges arranged in rows 1104. The second surface 1103 has negative charges arranged in rows 1119. The distance between the centerlines of rows of positive charges 1104 and the centerlines of rows of negative charges 1119 is C 1108. When the distance D 1117 from the sheet 1101 to the nearby object 1120 is at most the distance C 1108, electric field lines 1122 reach the nearby object 1120. Consequently, the rows of positive charges 1104 and the rows of negative charges 1119 attract the sheet 1101 to the nearby object 1120. For example, when distance C 1108 is 1 inch, the sheet 1101 is attracted to the nearby object 1120 when the distance D 1117 is at most 1 inch.

Figure 12:
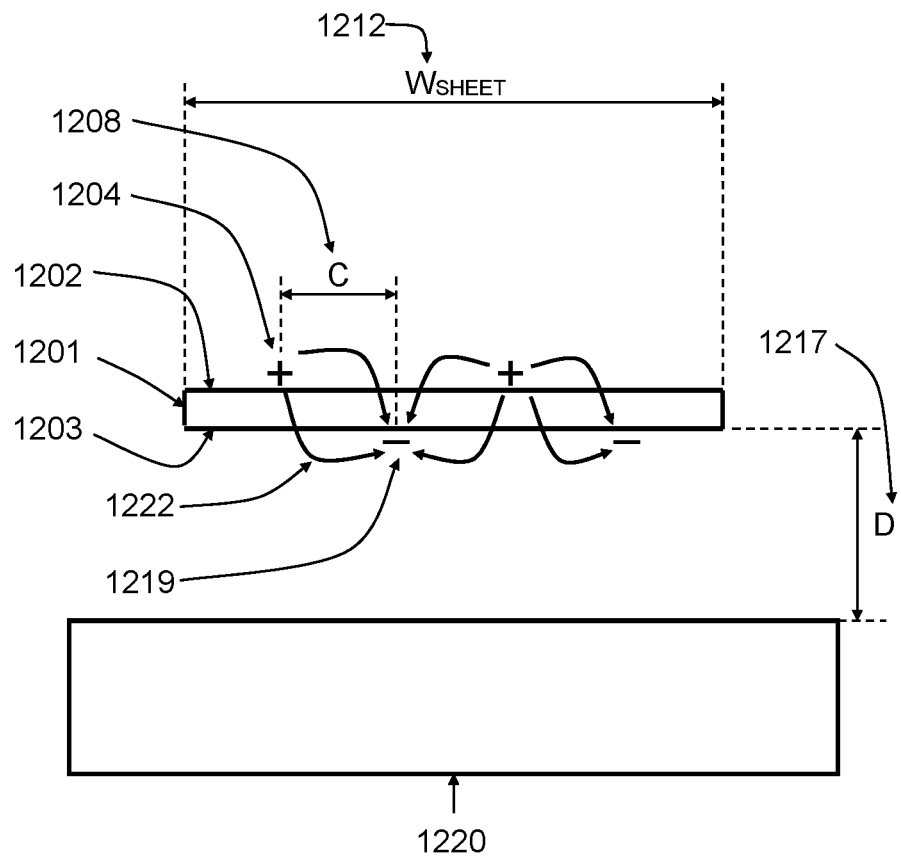
FIG. 12 is a side view showing a sheet with rows of positive charges on the first surface and rows of negative charges on the second surface with no attraction to the nearby object that is too far away.

FIG. 12 shows a side view of a sheet 1201 having Width $W_{SHEET}$ 1212. The sheet 1201 has a first surface 1202 and second surface 1203. The first surface 1203 has positive charges arranged in rows 1204. The second surface 1203 has negative charges arranged in rows 1219. The distance between the centerlines of rows of positive charges 1204 and the centerlines of rows of negative charges 1219 is C 1208. When the distance D 1217 from the sheet 1201 to the nearby object 1220 is greater than the distance C 1208, electric field lines 1222 do not reach the nearby object 1220. Consequently, the sheet 1201 is not attracted to the nearby object 1220. For example, when distance C 1208 is 1 inch, the sheet is not attracted to the nearby object 1220 when the distance D 1217 is greater than 1 inch.

FIG. 13 is a prospective view showing sheet 1301 arranged so that the first surface 1302 is exposed and so that the second surface 1303 is in contact with the metal bench top 1323 that is connected electrically to ground potential. The sheet 1301 is being pulled by hand so that it moves 1325 between a conductive brush 1311 and the metal bench top 1323.

U.S. Pat. No. 2,774,921 12/1956 to Walkup entitled "APPARATUS FOR ELECTROSTATICALLY CHARGING INSULATING IMAGE SURFACES FOR ELECTROPHOTOGRAPHY" describes an apparatus for applying electrostatic charges uniformly to an electrically insulating material that is on a conductive backing plate. The bristles of the conductive brush need not touch the surface of the insulating plate that is moving beneath the brush. Satisfactory results may be obtained with the bristles positioned somewhat above and out of contact with the surface. A potential source provides a DC voltage to the conductive brush through a suitable high-resistance electrically conductive material having a resistance in the range 10,000 ohms to 100 megaohms.

The conductive brush 1311 in FIG. 13 having a length $L_{BRUSH}$ 1332 is modified by removing some bristles forming regions having a width $W_{GAP}$ 1334 having no bristles and leaving regions having a width $W_{BRISTLE}$ 1333 having full length bristles. The full length bristles of the conductive brush 1311 may touch the exposed top surface 1302 of the sheet 1301. The bristles need not touch the top surface 1302. Satisfactory results may be obtained with the bristles positioned somewhat above and out of contact with the surface.

The power supply 1326 provides a DC voltage $V_{BRUSH}$ 1327 to the conductive brush through a suitable resistor R 1331 having a resistance in the range 10,000 ohms to 100 megaohms. Preferably, resistor R 1331 has a resistance of 1 megaohm.

When the power supply 1326 provides a positive voltage $V_{BRUSH}$ 1327, electrostatic charges arranged in rows 1304 are applied to the exposed first surface 1302 of sheet 1301. The distance 2C 1309 between the centerlines of rows of positive charges 1304 is the sum of $W_{BRISTLE}$ 1333 and $W_{GAP}$ 1334.

FIG. 14 is a prospective view showing sheet 1401 arranged so that the second side 1403 is exposed and so that the first side 1402 is in contact with a metal bench top 1423 that is connected electrically to ground. The sheet 1401 is being pulled by hand so that it moves 1425 between a conductive brush 1411 and the metal bench top 1423. The exposed second surface 1403 may touch the full length bristles of conductive brush 1411. The bristles need not touch the bottom surface 1403. Satisfactory results may be obtained with the bristles positioned somewhat above and out of contact with the surface.

Power supply 1426 provides DC voltage $V_{BRUSH}$ 1427 to conductive brush 1411 through resistor R 1431 that has a resistance in the range 10,000 ohms to 100 megaohms. Preferably, resistor R 1431 has a resistance of 1 megaohm.

When voltage $V_{BRUSH}$ 1427 is negative, rows of negative electrostatic charges 1419 are applied to the exposed second surface 1403 of the sheet 1401. The conductive brush 1411 is physically identical to conductive brush 1311 in FIG. 13. However, conductive brush 1411 is shifted horizontally so that the rows of negative electrostatic charges 1419 are offset from the rows of positive electrostatic charge 1304 applied to the first surface 1301 in FIG. 13. The resulting pattern of rows of electrostatic charges are shown in FIG. 12.

Using the method shown in FIG. 13 and in FIG. 14, positive electrostatic charges arranged in rows were applied to the first surface of an insulating polypropylene sheet and negative electrostatic charges arranged in rows were applied to the second surface of the polypropylene sheet. The conductive brush had regions with no bristles having a width $W_{GAP}$ of 0.5 inches. The conductive brush had regions with full length bristles having a width $W_{BRISTLE}$ of 0.5 inches. The spacing from the tips of full length bristles of the conductive brush to the surface of the insulating sheet, the voltages used to apply the positive and negative electrostatic charges, and the resulting amount of sticking are summarized in Table 1.

TABLE 1

Voltage set-points for samples

| Sample | Brush Spacing | Positive Voltage | Negative Voltage | Comments |
|---|---|---|---|---|
| 1 | 0.25 inches | +4.0 KV | −2.8 KV | Low level of sticking |
| 2 | 0.25 inches | +5.7 KV | −4.0 KV | Low level of sticking |
| 3 | 0.25 inches | +6.0 KV | −4.3 KV | Low level of sticking |
| 4 | Contacting | +3.7 KV | −3.0 KV | Very sticky |
| 5 | Contacting | +3.5 KV | −2.7 KV | Very sticky |
| 6 | Contacting | +3.7 KV | −3.0 KV | Very |
| 7 | Contacting | +3.7 KV | −3.0 KV | Sticky |
| 8 | Contacting | +3.7 KV | −3.0 KV | |
| 9 | Contacting | +3.7 KV | −3.0 KV | |
| 10 | Contacting | +3.7 KV | −3.0 KV | |
| 11 | Contacting | +3.7 KV | −3.0 KV | |
| 12 | Contacting | +3.7 KV | −3.0 KV | |

Preferably, the width $W_{GAP}$ on the conductive brush having no bristles should be 0.5 inches and the width $W_{BRISTLE}$ on the conductive brush having bristles should be 0.5 inches. Preferably, the full length bristles should touch the surface of the insulating sheet. Preferably, the positive voltage should be +3.7 KV and the negative voltage should be −3.0 KV.

What is claimed is:

1. A sheet attracted to a nearby object, the sheet comprising:
    the sheet having a sheet width $W_{SHEET}$,
    the sheet having a sheet length $L_{SHEET}$,
    the sheet width $W_{SHEET}$ is no larger than the sheet length $L_{SHEET}$,
    the sheet being a distance D from the nearby object,
    the distance D not exceeding the sheet width $W_{SHEET}$,
    the sheet having a first surface,
    the first surface having a multiplicity of electrostatic charges arranged in a first row,
    the first row having a row length $L_{ROW1}$,
    the row length $L_{ROW1}$ not exceeding sheet length $L_{SHEET}$,
    the first row having a centerline,
    the multiplicity of electrostatic charges arranged in the first row having a first electrostatic charge polarity $P_1$,
    the multiplicity of electrostatic charges arranged in the first row each having an electrostatic charge magnitude $Q_1$,
    the multiplicity of electrostatic charges each having the electrostatic charge magnitude $Q_1$ causing a first surface potential $V_1$,
    the first surface potential $V_1$ having a magnitude of at least 100 volts,
    the sheet having a second surface,
    the second surface having a multiplicity of electrostatic charges arranged in a second row,
    the second row having a row length $L_{ROW2}$,
    the row length $L_{ROW2}$ not exceeding sheet length $L_{SHEET}$,
    the second row having a centerline,
    the distance between the first centerline and the second centerline being distance C,
    distance C not exceeding the sheet length $L_{SHEET}$,
    the multiplicity of electrostatic charges arranged in the second row each having a second electrostatic charge polarity $P_2$, the second electrostatic charge polarity $P_2$ being the same as the first electrostatic charge polarity $P_1$, the multiplicity of electrostatic charges arranged in the second row each having an electrostatic charge magnitude $Q_2$, the multiplicity of electrostatic charges each having the electrostatic charge magnitude $Q_2$ causing a second surface potential $V_2$, the second surface potential $V_2$ having a magnitude of at least 100 volts, and the charge magnitude $Q_1$ and the charge magnitude $Q_2$ causing the sheet to be attracted to the nearby object.

2. A sheet attracted to a nearby object, the sheet comprising:

the sheet having a sheet width $W_{SHEET}$,
the sheet having a sheet length $L_{SHEET}$,
the sheet width $W_{SHEET}$ is no larger than the sheet length $L_{SHEET}$,
the sheet being a distance D from the nearby object,
the sheet having a first surface,
the first surface having a multiplicity of electrostatic charges arranged in a first row,
the first row having a row length $L_{ROW1}$,
the row length $L_{ROW1}$ not exceeding sheet length $L_{SHEET}$,
the first row having a first centerline,
the multiplicity of electrostatic charges arranged in the first row having a first polarity $P_1$,
the multiplicity of electrostatic charges arranged in the first row each having an electrostatic charge magnitude $Q_1$,
the multiplicity of electrostatic charges each having the electrostatic charge magnitude $Q_1$ causing a first surface potential $V_1$,
the first surface potential $V_1$ having a magnitude of at least 100 volts,
the first surface having an additional multiplicity of electrostatic charges arranged in a second row,
the second row having a row length $L_{ROW2}$,
the row length $L_{ROW2}$ not exceeding sheet length $L_{SHEET}$,
the second row having a second centerline,
the distance between the first centerline and the second centerline being distance C,
the distance D from the sheet to the nearby object not exceeding the distance C,
the multiplicity of electrostatic charges arranged in the second row having a second polarity $P_2$,
the second polarity $P_2$ being opposite to the first polarity $P_1$,
the multiplicity of electrostatic charges arranged in the second row each having an electrostatic charge magnitude $Q_2$, and
the electrostatic charge magnitude $Q_1$ and the electrostatic charge magnitude $Q_2$ causing the sheet to be attracted to the nearby object.

3. A sheet attracted to a nearby object, the sheet comprising:

the sheet having a sheet width $W_{SHEET}$,
the sheet having a sheet length $L_{SHEET}$,
the sheet width $W_{SHEET}$ is no larger than the sheet length $L_{SHEET}$,
the sheet being a distance D from the nearby object,
the sheet having a first surface,
the first surface having a multiplicity of electrostatic charges arranged in a first row,
the first row having a row length $L_{ROW1}$,
the row length $L_{ROW1}$ not exceeding sheet length $L_{SHEET}$,
the first row of electrostatic charges having a centerline,
the multiplicity of electrostatic charges in the first row having a first electrostatic charge polarity $P_1$,
the multiplicity of electrostatic charges arranged in the first row each having an electrostatic charge magnitude $Q_1$,
the multiplicity of electrostatic charges each having the electrostatic charge magnitude $Q_1$ causing a first surface potential $V_1$,
the first surface potential $V_1$ having a magnitude of at least 100 volts,
the sheet having a second surface,
the second surface having a multiplicity of electrostatic charges arranged in a second row,
the second row having a row length $L_{ROW2}$,
the row length $L_{ROW2}$ not exceeding sheet length $L_{SHEET}$,
the second row of electrostatic charges having a centerline,
the distance between the first centerline and the second centerline being distance C,
distance C not exceeding the sheet length $L_{SHEET}$,
the multiplicity of electrostatic charges arranged in the second row each having a second electrostatic charge polarity $P_2$,
the second electrostatic charge polarity $P_2$ being opposite to the first electrostatic charge polarity $P_1$,
the multiplicity of electrostatic charges arranged in the second row each having an electrostatic charge magnitude $Q_2$,
the multiplicity of electrostatic charges each having the electrostatic charge magnitude $Q_2$ causing a second surface potential $V_2$,
the second surface potential $V_2$ having a magnitude of at least 100 volts, and
the electrostatic charge magnitude $Q_1$ and the electrostatic charge magnitude $Q_2$ causing the sheet to be attracted to the nearby object.

4. A sheet attracted to a nearby object, the sheet comprising:

the sheet having a sheet width $W_{SHEET}$,
the sheet having a sheet length $L_{SHEET}$,
the sheet width $W_{SHEET}$ is no larger than the sheet length $L_{SHEET}$,
the sheet being a distance D from the nearby object,
the distance D being not exceeding the sheet width $W_{SHEET}$,
the sheet having a first surface,
the first surface having a multiplicity of electrostatic charges arranged in a first multiplicity of rows,
the first multiplicity of rows each having a row length $L_{ROW1}$,
the row length $L_{ROW1}$ not exceeding sheet length $L_{SHEET}$,
the first multiplicity of rows each having a centerline,
the centerlines of the first multiplicity of rows being equally spaced,
the first multiplicity of electrostatic charges each having a first electrostatic charge polarity $P_1$,
the first multiplicity of electrostatic charges each having an electrostatic charge magnitude $Q_1$,
the first multiplicity of electrostatic charges causing a first surface potential $V_1$,
the first surface potential $V_1$ having a magnitude of at least 100 volts,
the sheet having a second surface,
the second surface having a second multiplicity of electrostatic charges arranged in a second multiplicity of rows, the second multiplicity of rows each having a row length $L_{ROW2}$,
the row length $L_{ROW2}$ not exceeding sheet length $L_{SHEET}$,
the second multiplicity of rows each having a centerline,
the centerlines of the second multiplicity of rows being equally spaced,
the distances between the centerlines of the first multiplicity of rows and the centerlines of the second multiplicity of rows being distance C,
distance C not exceeding the sheet length $L_{SHEET}$ divided by 3,
the second multiplicity of electrostatic charges each having an electrostatic charge magnitude $Q_2$,
the second multiplicity of electrostatic charges each having a second electrostatic charge polarity $P_2$,
the second electrostatic charge polarity $P_2$ being the same as the first electrostatic charge polarity $P_1$,
the second multiplicity of electrostatic charges causing a second surface potential $V_2$,
the second surface potential $V_2$ having a magnitude of at least 100 volts, and
the electrostatic charge magnitude $Q_1$ and electrostatic charge magnitude $Q_2$ causing the sheet to be attracted to the nearby object.

5. A sheet attracted to a nearby object, the sheet comprising:
the sheet having a sheet width $W_{SHEET}$,
the sheet having a sheet length $L_{SHEET}$,
the sheet width $W_{SHEET}$ is no larger than the sheet length $L_{SHEET}$,
the sheet being a distance D from the nearby object,
the sheet having a first surface,
the first surface having a first multiplicity of electrostatic charges arranged in a first multiplicity of rows,
the first multiplicity of rows each having a row length $L_{ROW1}$,
the row length $L_{ROW1}$ not exceeding sheet length $L_{SHEET}$,
the first multiplicity of rows each having a centerline,
the centerlines of the first multiplicity of rows being equally spaced,
the first multiplicity of electrostatic charges each having an electrostatic charge magnitude $Q_1$,
the first multiplicity of electrostatic charges each having a first electrostatic charge polarity $P_1$,
the multiplicity of electrostatic charges causing a first surface potential $V_1$,
the first surface potential $V_1$ having a magnitude of at least 100 volts,
the sheet having a second surface,
the second surface having a second multiplicity of electrostatic charges arranged in a second multiplicity of rows,
the second multiplicity of rows each having a row length $L_{ROW2}$,
the row length $L_{ROW2}$ not exceeding sheet length $L_{SHEET}$,
the second multiplicity of rows each having a centerline,
the centerlines of the second multiplicity of rows being equally spaced,
the distances between the centerlines of the first multiplicity of rows and the centerlines of the second multiplicity of rows being distance C,
the distance C not exceeding the sheet length $L_{SHEET}$ divided by 3,
the distance D from the sheet to the nearby object is no greater than distance C,
the second multiplicity of electrostatic charges each having an electrostatic charge magnitude $Q_2$,
the second multiplicity of electrostatic charges each having a second electrostatic charge polarity $P_2$,
the second electrostatic charge polarity being opposite to the first electrostatic charge polarity,
the second multiplicity of electrostatic charges causing a second surface potential $V_2$,
the second surface potential $V_2$ having a magnitude of at least 100 volts, and
the charge magnitude $Q_1$ and charge magnitude $Q_2$ causing the sheet to be attracted to the nearby object.

* * * * *